(12) United States Patent
Gogolla et al.

(10) Patent No.: US 7,714,990 B2
(45) Date of Patent: May 11, 2010

(54) HAND-HELD LASER DISTANCE MEASURING DEVICE WITH A PULSE REFLECTION MIXING METHOD

(75) Inventors: Torsten Gogolla, Schaan (LI); Andreas Winter, Rankweil (AT); Helmut Seifert, Serba (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/015,439

(22) Filed: Jan. 16, 2008

(65) Prior Publication Data

US 2008/0204701 A1 Aug. 28, 2008

Related U.S. Application Data

(63) Continuation-in-part of application No. 11/304,966, filed on Dec. 14, 2005, now abandoned.

(30) Foreign Application Priority Data

Dec. 16, 2004 (DE) .................. 10 2004 060 619

(51) Int. Cl.
*G01C 3/08* (2006.01)
(52) U.S. Cl. ............... 356/5.15; 356/5.01; 356/5.09
(58) Field of Classification Search ........ 356/4.01–5.15
See application file for complete search history.

(56) References Cited

U.S. PATENT DOCUMENTS

| | | | | |
|---|---|---|---|---|
| 4,016,563 A | * | 4/1977 | Pedinoff | 342/192 |
| 4,521,107 A | * | 6/1985 | Chaborski et al. | 356/5.06 |
| 5,179,286 A | * | 1/1993 | Akasu | 250/559.38 |
| 5,742,379 A | * | 4/1998 | Reifer | 356/5.07 |
| 6,252,655 B1 | * | 6/2001 | Tanaka | 356/5.06 |
| 6,989,782 B2 | * | 1/2006 | Walker et al. | 342/134 |
| 7,623,222 B2 | * | 11/2009 | Benz et al. | 356/5.09 |
| 2001/0009458 A1 | * | 7/2001 | Asaka et al. | 356/28.5 |
| 2004/0085526 A1 | * | 5/2004 | Gogolla et al. | 356/4.01 |

\* cited by examiner

*Primary Examiner*—Isam Alsomiri
(74) *Attorney, Agent, or Firm*—Abelman, Frayne & Schwab

(57) ABSTRACT

A hand-held pulse laser distance measuring device and a pulse reflection mixing method both having an algorithm which controls a microcontroller and which serves to calculate the distance to a measurement object by at least two different time differences $\tau_{11}$, $\tau_{12}$ between a measurement pulse and a reference pulse with a pulse width $\Delta t$, which time differences $\tau_{11}$, $\tau_{12}$ are measured with a pulse repetition frequency $f_1$, $f_2$, respectively, wherein a selection module is provided which selects at least the first pulse repetition frequency $f_1$ from at least a first frequency set $\{f\}_1$ with at least one other pulse repetition frequency $f_{1i}$ in such a way that the condition $|\tau_{11} \cdot f_{1i}| > A > 2 \cdot |\Delta t_{11} \cdot f_{1i}|$ is satisfied with a pre-selected lower limit A, a relative time difference $|\tau_{1i} \cdot f_{1i}|$ and a relative pulse width $|\Delta t_\lambda \cdot f_{1i}|$.

12 Claims, 1 Drawing Sheet

HAND-HELD LASER DISTANCE MEASURING DEVICE WITH A PULSE REFLECTION MIXING METHOD

CROSS-REFERENCE TO RELATED APPLICATIONS

Continuation-in-part of U.S. application Ser. No. 11/304,966, filed on Dec. 14, 2005.

BACKGROUND OF THE INVENTION

1. Field of the Invention

The invention relates to a hand-held laser distance measuring device with a pulse reflection mixing method, in particular a hand-held construction laser distance measuring device.

2. Description of the Prior Art

In the building industry, distances must be exactly determined with an accuracy of within a few millimeters at a range of up to several hundreds of meters distance. The hand-held laser distance measuring devices which are suitably constructed for this purpose and to which the present invention is directed use a pulse reflection mixing method of a modulated visible laser beam for measuring distance.

In EP610918B1, a short pulse train is used for distance measurement. After detection, this short pulse train excites an electronic resonator that is adapted to the pulse train frequency. The elevated signal of the resonator causes a laser to emit a new pulse train. This process is continuously repeated so that pulse cycles occur with a determined cycle frequency. The measured distance is determined by this cycle frequency.

DE3103567C2 introduces a method for direct measurement of the light pulse time-of-flight in which a measurement light pulse traveling over the measurement distance and a reference light pulse traveling over the reference distance are detected by the same photodetector. The detected measurement light pulse and reference light pulse start and stop a time measurement system, e.g., a fast counter. The measurement distance is determined definitively by means of direct and definitive measurement of the time difference between the detection of the reference light pulse and the detection of the measurement light pulse. The maximum repetition frequency of the light pulses is accordingly limited by the condition of the definitive determination of distance.

However, it is disadvantageous that measurement is impossible when the measurement distance corresponds to one half of the reference distance because the two pulses overlap. This problem can be solved by using a switchable reference distance in the form of a light-conducting fiber so that a different reference distance can be selected in case of overlapping pulses.

DE10112833C1 discloses a hand-held laser distance measuring device with a pulse reflection mixing method. The detection pulse train detected by the light detector or, in case of separate light detectors, the reference pulse train on the one hand and the measurement pulse train on the other hand are preferably directly subjected to direct mixing in the respective light detector followed by low-pass filtering. The direct mixing is controlled by a LO pulse train which is locally generated at the measurement point and whose duty factor is equal to, or approximately equal to, the duty factor of the measurement pulse train and whose repetition frequencies are selected so as to differ slightly.

Accordingly, the mixing pulse repetition frequency $f_M$ of the low-frequency pulse train corresponds to the amount of the difference between the pulse repetition frequency f of the transmission pulse train and measurement pulse train on the one hand and the pulse repetition frequency of the local oscillator pulse train $f_{LO}$ on the other hand. Therefore: $f_M = |f - f_{LO}|$. Like the high-frequency detection pulse train, the low-frequency mixing pulse train likewise comprises reference pulses and measurement pulses whose time delay is a measure of the distance. For further particulars, the person skilled in the art is referred to the above-cited document, whose disclosure is explicitly incorporated herein in its entirety.

In hand-held laser distance measuring devices of the type mentioned above using a pulse reflection mixing method, commercially available laser diodes emitting in the visible red wavelength range are used as laser sources. The emitted laser light is modulated by a series of very narrow spike pulses, hereinafter a transmitting pulse train, and bundled into a measurement laser beam by a collimating lens. Accordingly, this special hand-held laser distance measuring device with pulse reflection mixing requires a series of very narrow laser pulses with a usual width of between 60 ps and 80 ps as a transmitting pulse train.

The pulse repetition frequency f of the laser pulses ranging from 50 MHz to 200 MHz is very high compared to the pulse repetition frequency of several tens of kHz found in conventional hand-held pulse laser distance measuring devices, so that it is generally impossible to determine distances definitively at a range of up to several hundreds of meters distance with one measurement at a determined fixed pulse repetition frequency. Therefore, at least two measurements with two substantially different pulse repetition frequencies or differences of pulse repetition frequencies $f_1$ and $f_2$, and for very great distance ranges with high accuracy, even n different pulse repetition frequencies, are needed for a definitive determination of distance. Using an algorithm, a microcontroller determines the time differences $\tau_k$, generally in a non-definitive manner, between the reference pulses and the measurement pulses of the low-frequency mixing pulses at different pulse repetition frequencies $f_k$ and, from the latter, determines the distance from the rangefinder to the light spot on the measurement object by means of the light velocity.

At certain distances with a time difference $\tau_k=0$, an overlapping of the reference pulse and measurement pulse results due to a finite pulse width $\Delta t$. Since this renders measurement impossible, the microcontroller in this case chooses a slightly different pulse repetition frequency $f_{ki}$ at which no overlapping occurs. It is disadvantageous that an increased distance measurement error must be taken into account even with a small $\tau_k$ because the two pulses influence one another due to the small distance.

In the following, the time difference between a reference pulse and a measurement pulse with respect to the period $\lambda = 1/f_k$ is referred to as the relative time difference $\tau_k \cdot f_k$ and the pulse width with respect to the period $\lambda = 1/f_k$ is referred to as the relative pulse width $\Delta t_\lambda \cdot f_k$.

The object of the invention is to realize a hand-held laser distance measuring device with pulse reflection mixing having increased distance measuring accuracy. A further object is an algorithm for generating pulse repetition frequencies that are optimal with respect to distance measuring accuracy.

SUMMARY OF THE INVENTION

These and other objects of the present invention, which will become apparent hereinafter are achieved by providing a hand-held pulse laser distance measuring device with pulse reflection mixing having an algorithm which controls a microcontroller and which serves to calculate the distance to a measurement object by at least two different time differences $\tau_{11}, \tau_{12}$ between a measurement pulse and a reference pulse, which time differences a $\tau_{11}$, $\tau_{12}$ are measured with a pulse repetition frequency $f_{11}$, $f_{12}$, respectively, has a selection module which selects at least the first pulse repetition frequency $f_{11}$, from at least a first frequency set $\{f\}_1$ with at least one other pulse repetition frequency $f_{1i}$ in such a way that the amount of the relative time difference $|\tau_{11} \cdot f_{11}|$ between a reference pulse and a measurement pulse with respect to the period $\lambda = 1/f_{11}$ is greater than a pre-selected lower limit A which is at least greater than twice the relative pulse width $|\Delta t_\lambda \cdot f_1|$ with respect to the period $\lambda$.

In the step preceding the calculation of the distance from the at least two time differences $\tau_{11}$, $\tau_{12}$ after the measurement of at least two time differences $\tau_{11}$, $\tau_{12}$ measured with different pulse repetition frequencies $f_{11}$, $f_{12}$, the associated measuring method has a selection step which selects at least the first pulse repetition frequency $f_{11}$ from at least a first frequency set $\{f\}_1$ with at least one other pulse repetition frequency $f_{11}$ in such a way that the amount of the relative time difference $|\tau_{11} \cdot f_{11}|$ between a reference pulse and a measurement pulse with respect to the period $\lambda = 1/f_{11}$ is greater than the pre-selected lower limit A which is at least greater than twice the relative pulse width $|\Delta t_\lambda \cdot f_{1i}|$ with respect to the period $\lambda$.

By selecting a sufficiently suitable pulse repetition frequency, the mutual influence of the measurement pulse and the reference pulse is reduced to a minimum because interference such as post-oscillation has less impact at a sufficiently great interval between the measurement pulse and the reference pulse. The distance measuring accuracy is appreciably improved in this way.

The second pulse repetition frequency $f_{22}$ is advantageously selected from at least a second frequency set $\{f\}_2$ with at least one other pulse repetition frequency $f_{2i}$ in such a way that the amount of the relative time difference $|\tau_{22} \cdot f_{22}|$ between a reference pulse and a measurement pulse with respect to the period $\lambda = 1/f_{22}$ is greater than the pre-selected lower limit A which is at least greater than twice the relative pulse width $|\Delta t_\lambda \cdot f_{2i}|$ with respect to the period $\lambda$, so that the mutual influence of the two time differences needed for calculation is reduced.

With a quantity n of pulse repetition frequencies $f_1 \ldots f_n$ used for calculating the distance, a pulse repetition frequency $f_k$, where k is a set-index with $k \leq n$, is advantageously selected in each instance from at least one other frequency set $\{f\}_k$ with at least one other pulse repetition frequency $f_{ki}$ in such a way that the amount of the time difference $|\tau_{ki} \cdot f_{ki}|$ between a reference pulse and a measurement pulse with respect to the period $\lambda = 1/f_{ki}$ is greater than the pre-selected lower limit A which is at least greater than twice the relative pulse width $|\Delta t_\lambda \cdot f_{ki}|$ with respect to the period $\lambda$, so that the mutual influence of all time differences needed for calculating large distances with high accuracy is reduced and the reliability of measurements is accordingly increased.

It is advantageous when at least one pulse repetition frequency $f_{kj}$ is selected, with j being a special selected progression index, and more advantageous when all pulse repetition frequencies $f_{kj}$ are selected, in such a way that the amount $|\tau_{kj} \cdot f_{kj} - 1/2|$ is minimal so that optimal pulse repetition frequencies $f_{kj}$ are used for the calculation.

The individual pulse repetition frequencies $f_{ki}$ in the frequency set $\{f\}_k$ are advantageously individual terms of a geometrical progression with a progression index i, that is, for example, partial frequencies $f_{0k}/4, f_{0k}/5, f_{0k}/6, \ldots f_{0k}/i$ derived from a reference frequency $f_{0k}$, so that there is a strong convergence to a permissible time difference $\tau_{ki}$ in the measurement sequence as the progression index i increases.

The lower limit A for the selection of the pulse repetition frequency is advantageously greater than five-times the relative pulse width so that a sufficiently high distance measuring accuracy always results because of the sufficiently large pulse spacing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
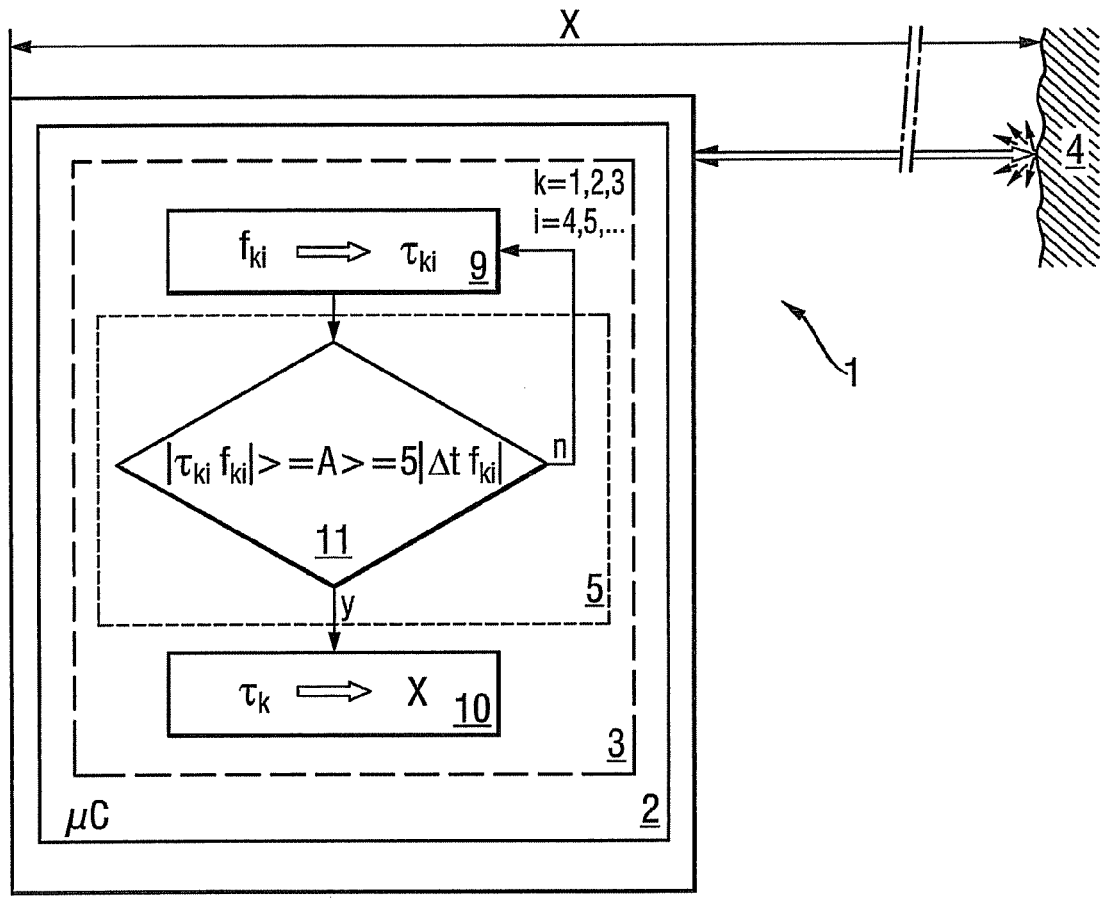
FIG. 1 a schematic view of a hand-held laser distance measuring device with an algorithm.
Figure 2:
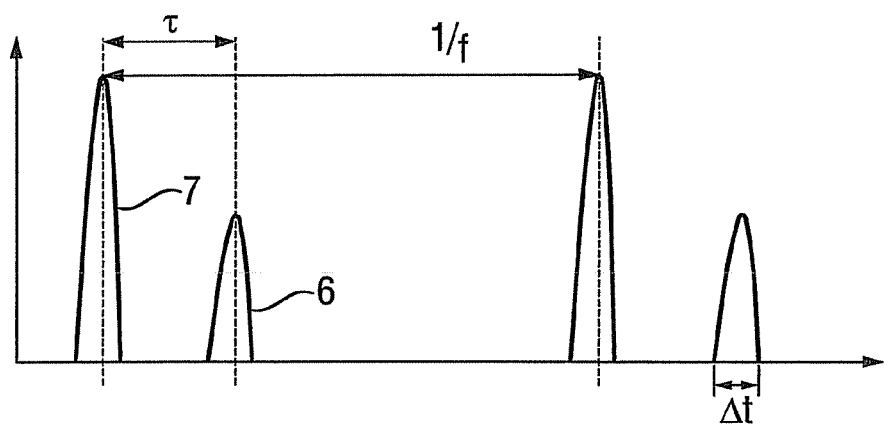
FIG. 2 a pulse train in normalized time scale.

According to FIG. 1 and FIG. 2, a hand-held laser distance measuring device 1, shown schematically, with pulse reflection mixing has an algorithm 3 which controls a microcontroller 2 and which serves to calculate the distance X to a measurement object 4. The measurement of three time differences $\tau_1$, $\tau_2$, $\tau_3$ between a measurement pulse 6 and a reference pulse 7 which are measured with substantially different pulse repetition frequencies $f_1$, $f_2$, $f_3$, where k is a set index with k=1, 2, 3 of the range index, is carried out in the algorithm 3 in a measurement step 9. In a subsequent calculation step 10, the distance X is calculated from the three time differences $\tau_1$, $\tau_2$, $\tau_3$. In a selection step 11 of a selection module 5 of the algorithm 3 between the measurement step 9 and the calculation step 10, precisely the three different time differences $\tau_1$, $\tau_2$, $\tau_3$ measured, respectively, with a different pulse repetition frequency $f_1$, $f_2$, $f_3$ are selected from a tested test progression of a frequency set $\{f\}_1, \{f\}_2, \{f\}_3$ in such a way that each amount $|\tau_1 \cdot f_1 - 1/2|$, $|\tau_2 \cdot f_2 - 1/2|$ and $|\tau_3 \cdot f_3 - 1/2|$ is minimal, i.e., the scaled interval between the measurement pulse 6 and the reference pulse 7 is a maximum in each instance. Each of the frequency sets $\{f\}_1 = \{400/4 \text{ MHZ}, 400/5 \text{ MHZ}, 400/6 \text{ MHZ}, \ldots\} = \{f_{01}/i\}$,
$\{f\}_2 = \{40/4 \text{ MHZ}, 40/5 \text{ MHZ}, 40/6 \text{ MHZ}, \ldots\} = \{f_{02}/i\}$,
and
$\{f\}_3 = \{4/4 \text{ MHZ}, 4/5 \text{ MHZ}, 4/6 \text{ MHZ}, \ldots\} = \{f_{03}/i\}$, contains individual pulse repetition frequencies $f_{ki}$ representing individual terms of a geometric progression with a progression index $i = 4, 5, 6, \ldots$ which were derived in each instance from a reference frequency $f_{01} = 400$ MHz, $f_{02} = 40$ MHz and $f_{03} = 4$ MHz as i-th partial frequencies. With the interrupt condition of the test progression of tested pulse repetition frequencies $f_{ki}$ per frequency set $\{f\}_k$ set at a permissible relative time difference $|\tau_{ki} \cdot f_{ki}| \geq A \geq 5 |\Delta t \cdot f_{ki}|$, the selection module 5 contains, in addition, a pre-selected lower limit A for calculating the distance X.

The pre-selected lower limit A is a freely settable test value which is not set by a user, by instead is set by the device and method themselves. Accordingly, the value A can be set arbitrarily by the algorithm to be the pre-selected lower limit of A, described above. The algorithm them tests if the condition $|\tau_{1i} \cdot f_{1i}| > A > 2 \cdot |\Delta t_\lambda \cdot f_{1i}|$ is satisfied, for a value $\Delta t_\lambda$ determined during testing. If the condition is satisfied, then the test procedure is finished, and then with the values of A, the distance X will be determined by the algorithm. However, if the condition is not satisfied, then the next value for i is tested with the same pre-selected value of A.

For each frequency set $\{f\}_k$, the first pulse repetition frequency $f_k$ which meets the above-stated interrupt condition automatically satisfies the condition that the amount $|\tau_k \cdot f_k - 1/2|$ is minimal with respect to all of the tested pulse repetition frequencies $f_{ki}$ of the test progression.

Accordingly, the present invention provides a hand-held pulse laser distance measuring device with an algorithm (3) which controls a microcontroller (2) and which serves to calculate a distance (X) to a measurement object (4) by at least two different time differences ($\tau_{11}, \tau_{12}$) between a measurement pulse (6) and a reference pulse (7) with a pulse width ($\Delta t$), which time differences ($\tau_{11}, \tau_{12}$) are measured with a pulse repetition frequency ($f_{11}, f_{12}$), respectively, wherein the pulse laser distance measuring device includes a selection module (5) for selecting at least a first pulse repetition frequency ($f_{11}$) from at least a first frequency set ($\{f\}_1$) with at least one other pulse repetition frequency ($f_{1i}$) in such a way that the condition $|\tau_{1i} \cdot f_{1i}| > A > 2 \cdot |\Delta t_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, whereby i=1, 2.

In addition, the present invention provides a pulse reflection mixing method for a hand-held laser distance measuring device (1) for calculating a distance (X) to a measurement object (4) with an algorithm (3) which is controlled by a microcontroller (2) with a measurement step (9) for measuring at least two time differences ($\tau_{11}, \tau_{12}$) between a measurement pulse (6) and a reference pulse (7) with a pulse width ($\Delta t$), which time differences ($\tau_{11}, \tau_{12}$) are measured with different pulse repetition frequencies ($f_{11}, f_{12}$), and a subsequent calculation step (10) for calculating the distance (X) from the at least two time differences ($\tau_{11}, \tau_{12}$), wherein the first pulse repetition frequency ($f_{11}$) is selected from at least a first frequency set ($\{f\}_1$) with at least one other pulse repetition frequency ($f_{1i}$) in such a way that the condition $|\tau_{1i} \cdot f_{1i}| > A > 2 \cdot |\Delta_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_{80} \cdot f_{1i}|$, whereby i=1, 2.

The present invention also provides an algorithm for a hand-held pulse laser distance measuring device and which controls a microcontroller (2) and serves to calculate a distance (X) to a measurement object (4) by at least two different time differences ($\tau_{k1}, \tau_{k2}$) between a measurement pulse (6) and a reference pulse (7) with a pulse width ($\Delta t$), which time differences ($\tau_{k1}, \tau_{k2}$) are measured with a pulse repetition frequency ($f_{k1}, f_{k2}$), respectively, wherein the pulse laser distance measuring device includes a selection module (5) for selecting at least a first pulse repetition frequency ($f_{11}$) from at least a first frequency set ($\{f\}_1$) with at least one other pulse repetition frequency ($f_{1i}$) in such a way that the condition $|\tau_{1i} \cdot f_{1i}| > A > 2 \cdot |\Delta t \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, and wherein the second pulse repetition frequency ($f_{22}$) is selected from at least a second frequency set ($\{f\}_2$) with at least one other pulse repetition frequency ($f_{2i}$) in such a way that the condition $|\tau_{2i} \cdot f_{2i}| > A > 2 \cdot |\Delta t \cdot f_{2i}|$ is satisfied with the pre-selected lower limit (A), a relative time difference $|\tau_{2i} \cdot f_{2i}|$ with respect to period $1|f_{2i}$ and a relative pulse width $|\Delta t_\lambda \cdot f_{2i}|$, whereby i=1, 2, and k=1, 2.

In the algorithm, with a quantity (n) of pulse repetition frequencies ($f_{k1} \ldots f_{kj} \ldots f_{kn}$) used for calculating the distance (X), where a j-th pulse repetition frequency ($f_{kj}$) is selected in each instance from at least one k-th frequency set ($\{f\}_k$) with at least one other pulse repetition frequency ($f_{ki}$) in such a way that the condition $|\tau_{kj} \cdot f_{kj}| > A > 2 \cdot |\Delta t_\lambda \cdot f_{kj}|$ is satisfied with a pre-selected lower limit (A), a relative time difference $|\tau_{kj} \cdot f_{kj}|$ and a relative pulse width $|\Delta t_\lambda \cdot f_{kj}|$, whereby i=1 . . . n, and k=1 . . . m. Also, in the algorithm, the pre-selected lower limit A for selecting the pulse repetition frequency ($f_{ki}$) is greater than five-times the relative pulse width $|\Delta t_\lambda \cdot f_i|$. In the algorithm, at least one pulse repetition frequency ($f_{kj}$) is selected in such a way that the amount $|\tau_{kj} \cdot f_{kj} - 1/2|$ is minimal. Also, in the algorithm, the individual pulse repetition frequencies ($f_{ki}$) in the frequency set ($\{f\}_k$) are individual terms of a geometrical progression with a progression index i.

In addition, the present invention also provides a pulse reflection mixing method for a hand-held laser distance measuring device (1) for calculating a distance (X) to a measurement object (4) with the algorithm (3) being controlled by a microcontroller (2) with a measurement step (9) for measuring at least two time differences ($\tau_{k1}, \tau_{k2}$) between a measurement pulse (6) and a reference pulse (7) with a pulse width ($\Delta t$), which time differences ($\tau_{k1}, \tau_{k2}$) are measured with different pulse repetition frequencies ($f_{k1}, f_{k2}$) and a subsequent calculation step (10) for calculating the distance (X) from the at least two time differences ($\tau_{k1}, \tau_{k2}$), wherein the first pulse repetition frequency ($f_{11}$) is selected from at least a first frequency set ($\{f\}_1$) with at least one other pulse repetition frequency ($f_{1i}$) in such a way that the condition $|\tau_{1i} \cdot f_{1i}| > A > 2 \cdot |\Delta t_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, and wherein the second pulse repetition frequency ($f_{22}$) is selected from at least a second frequency set ($\{f\}_2$) with at least one other pulse repetition frequency ($f_{2i}$) in such a way that the condition $|\tau_{2i} \cdot f_{2i}| > A > 2 \cdot |\Delta t_\lambda \cdot f_{2i}|$ is satisfied with the pre-selected lower limit (A), a relative time difference $|\tau_{2i} \cdot f_{2i}|$ with respect to period $1|f_{2i}$ and a relative pulse width $|\Delta t_\lambda \cdot f_{2i}|$, whereby i=1, 2, and k=1, 2.

In the algorithm, with a quantity (n) of pulse repetition frequencies ($f_{k1} \ldots f_{kj} \ldots f_{kn}$) used for calculating the distance (X), where a j-th pulse repetition frequency ($f_{kj}$) is selected in each instance from at least one k-th frequency set ($\{f\}_k$) with at least one other pulse repetition frequency ($f_{ki}$) in such a way that the condition $|\tau_{kj} \cdot f_{kj}| > A > 2 \cdot |\Delta t_\lambda \cdot f_{kj}|$ is satisfied with a pre-selected lower limit (A), a relative time difference $|\tau_{kj} \cdot f_{kj}|$ and a relative pulse width $|\Delta t_\lambda \cdot f_{kj}|$, whereby i=1 . . . n, and k=1 . . . m. Also, in the algorithm, the pre-selected lower limit A for selecting the pulse repetition frequency ($f_{ki}$) is greater than five-times the relative pulse width $|\Delta t_\lambda \cdot f_i|$. In the algorithm, at least one pulse repetition frequency ($f_{kj}$) is selected in such a way that the amount $|\tau_{kj} \cdot f_{kj} - 1/2|$ is minimal. Also, in the algorithm, the individual pulse repetition frequencies ($f_{ki}$) in the frequency ($\{f\}_k$) are individual terms of a geometrical progression with a progression index i.

Though the present invention was shown and described with reference to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held pulse laser distance measuring device with an algorithm (3) which controls a microcontroller (2) and which serves to calculate a distance (X) to a measurement object (4) by at least two different time differences ($\tau_{11}, \tau_{12}$) between a measurement pulse (6) and a reference pulse (7) with a pulse width ($\Delta t$), which time differences ($\tau_{11}, \tau_{12}$) are measured with a pulse repetition frequency ($f_{11}, f_{12}$), respectively, wherein the pulse laser distance measuring device includes a selection module (5) for selecting at least a first pulse repetition frequency ($f_{11}$) from at least a first frequency set ($\{f\}_1$) with at least one other pulse repetition frequency ($f_{1i}$) in such a way that the condition $|\tau_{1i} \cdot f_{1i}| > A > 2 \cdot |\Delta t_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, whereby i=1,2.

2. A pulse reflection mixing method for a hand-held laser distance measuring device (1) for calculating a distance (X) to a measurement object (4) with an algorithm (3) which is controlled by a microcontroller (2) with a measurement step (9) for measuring at least two time differences ($\tau_{11}, \tau_{12}$) between a measurement pulse (6) and a reference pulse (7) with a pulse width ($\Delta t$), which time differences ($\tau_{11}, \tau_{12}$) are measured with different pulse repetition frequencies ($f_{11}, f_{12}$), and a subsequent calculation step (10) for calculating the distance (X) from the at least two time differences ($\tau_{11}, \tau_{12}$), wherein the first pulse repetition frequency ($f_{11}$) is selected from at least a first frequency set ($\{f\}_1$) with at least one other pulse repetition frequency ($f_{1i}$) in such a way that the condition $|\tau_{1i} \cdot f_{1i}| > A > 2 \cdot |\Delta t_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, whereby i=1,2.

3. An algorithm for a hand-held pulse laser distance measuring device and which controls a microcontroller (2) and serves to calculate a distance (X) to a measurement object (4) by at least two different time differences ($\tau_{k1}, \tau_{k2}$) between a measurement pulse (6) and a reference pulse (7) with a pulse width ($\Delta t$), which time differences ($\tau_{k1}, \tau_{k2}$) are measured with a pulse repetition frequency ($f_{k1}, f_{k2}$), respectively, wherein the pulse laser distance measuring device includes a selection module (5) for selecting at least a first pulse repetition frequency ($f_{11}$) from at least a first frequency set ($\{f\}_1$) with at least one other pulse repetition frequency ($f_{1i}$) in such a way that the condition $|\tau_{1i} \cdot f_{1i}| > A > 2 \cdot |\Delta t_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, and wherein the second pulse repetition frequency ($f_{22}$) is selected from at least a second frequency set ($\{f\}_2$) with at least one other pulse repetition frequency ($f_{2i}$) in such a way that the condition $|\tau_{2i} \cdot f_{2i}| > A > 2 \cdot |\Delta t_{80} \cdot f_{2i}|$ is satisfied with the pre-selected lower limit (A), a relative time difference $|\tau_{2i} \cdot f_{2i}|$ with respect to period $1|f_{2i}$ and a relative pulse width $|\Delta t_{80} \cdot f_{2i}|$, whereby i=1,2, and k=1,2.

4. An algorithm according to claim 3, wherein, with a quantity (n) of pulse repetition frequencies ($f_{k1} \ldots f_{kj} \ldots f_{kn}$) used for calculating the distance (X), where a j-th pulse repetition frequency ($f_{kj}$) is selected in each instance from at least one k-th frequency set ($\{f\}_k$) with at least one other pulse repetition frequency ($f_{ki}$) in such a way that the condition $|\tau_{kj} \cdot f_{kj}| > A > 2 \cdot |\Delta t_\lambda \cdot f_{kj}|$ is satisfied with a pre-selected lower limit (A), a relative time difference $|\tau_{kj} \cdot f_{kj}|$ and a relative pulse width $|\Delta t_\lambda \cdot f_{kj}|$, whereby i=1 . . . n, and k=1 . . . m.

5. An algorithm according to claim 3, wherein in that the pre-selected lower limit A for selecting the pulse repetition frequency ($f_{ki}$) is greater than five-times the relative pulse width $\Delta t\lambda \cdot f_i$.

6. An algorithm according to claim 3, wherein at least one pulse repetition frequency ($f_{kj}$) is selected in such a way that the amount $|\tau_{kj} \cdot f_{kj} - 1/2|$ is minimal.

7. An algorithm according to claim 3, wherein the individual pulse repetition frequencies ($f_{ki}$) in the frequency set ($\{f\}_k$) are individual terms of a geometrical progression with a progression index (i).

8. An algorithm for a pulse reflection mixing method for a hand-held laser distance measuring device (1) for calculating a distance (X) to a measurement object (4) with the algorithm (3) being controlled by a microcontroller (2) with a measurement step (9) for measuring at least two time differences ($\tau_{k1}, \tau_{k2}$) between a measurement pulse (6) and a reference pulse (7) with a pulse width ($\Delta t$), which time differences ($\tau_{k1}, \tau_{k2}$) are measured with different pulse repetition frequencies ($f_{k1}, f_{k2}$), and a subsequent calculation step (10) for calculating the distance (X) from the at least two time differences ($\tau_{k1}, \tau_{k2}$), wherein the first pulse repetition frequency ($f_{11}$) is selected from at least a first frequency set ($\{f\}_1$) with at least one other pulse repetition frequency ($f_{1i}$) in such a way that the condition $|\tau_{1i} \cdot f_{1i}| > A > 2 \cdot |\Delta t_\lambda \cdot f_{1i}|$ is satisfied with a pre-selected lower limit (A), a relative time difference $|\tau_{1i} \cdot f_{1i}|$ with respect to period $1|f_{1i}$ and a relative pulse width $|\Delta t_\lambda \cdot f_{1i}|$, and wherein the second pulse repetition frequency ($f_{22}$) is selected from at least a second frequency set ($\{f\}_2$) with at least one other pulse repetition frequency ($f_{2i}$) in such a way that the condition $|\tau_{2i} \cdot f_{2i}| > A > 2 \cdot |\Delta t_\lambda \cdot f_{2i}|$ is satisfied with the pre-selected lower limit (A), a relative time difference $|\tau_{2i} \cdot f_{2i}|$ with respect to period $1|f_{2i}$ and a relative pulse width $|\Delta t_\lambda \cdot f_{2i}|$, whereby i=1,2, and k=1,2.

9. An algorithm according to claim 8, wherein, with a quantity (n) of pulse repetition frequencies ($f_{k1} \ldots f_{kj} \ldots f_{kn}$) used for calculating the distance (X), where a j-th pulse repetition frequency ($f_{kj}$) is selected in each instance from at least one k-th frequency set ($\{f\}_k$) with at least one other pulse repetition frequency ($f_{ki}$) in such a way that the condition $|\tau_{kj} \cdot f_{kj}| > A > 2 \cdot |\Delta t_\lambda \cdot f_{kj}|$ is satisfied with a pre-selected lower limit (A), a relative time difference $|\tau_{kj} \cdot f_{kj}|$ and a relative pulse width $|\Delta t_\lambda \cdot f_{kj}|$, whereby i=1 . . . n, and k=1 . . . m.

10. An algorithm according to claim 8, wherein in that the pre-selected lower limit A for selecting the pulse repetition frequency ($f_{ki}$) is greater than five-times the relative pulse width $|\Delta t_\lambda \cdot f_i|$.

11. An algorithm according to claim 8, wherein at least one pulse repetition frequency ($f_{kj}$) is selected in such a way that the amount $|\tau_{kj} \cdot f_{kj} - 1/2|$ is minimal.

12. An algorithm according to claim 8, wherein the individual pulse repetition frequencies ($f_{ki}$) in the frequency ($\{f\}_k$) are individual terms of a geometrical progression with a progression index (i).

* * * * *